United States Patent [19]
Watanabe

[11] Patent Number: 6,085,070
[45] Date of Patent: Jul. 4, 2000

[54] RADIO COMMUNICATING APPARATUS

[75] Inventor: Mitsuhiro Watanabe, Ebina, Japan

[73] Assignee: Canon Kabushiki Kaisha, Tokyo, Japan

[21] Appl. No.: 08/796,599

[22] Filed: Feb. 7, 1997

Related U.S. Application Data

[63] Continuation of application No. 08/378,967, Jan. 26, 1995.

[30] Foreign Application Priority Data

Jan. 27, 1994 [JP] Japan ................................ 6-007616

[51] Int. Cl.[7] .................................................. H04M 1/64
[52] U.S. Cl. ......................... 455/38.2; 379/201; 455/550
[58] Field of Search .................................. 455/455, 434, 455/421, 38.3, 127, 550; 379/201

[56] References Cited

U.S. PATENT DOCUMENTS

| | | | |
|---|---|---|---|
| 4,039,760 | 8/1977 | Gregory | 379/61 |
| 4,783,844 | 11/1988 | Higashiyama et al. | 455/455 |
| 5,054,042 | 10/1991 | Soury et al. | 379/58 |
| 5,119,397 | 6/1992 | Dahlin et al. | 455/434 X |
| 5,253,287 | 10/1993 | Hasegawa | 379/61 |
| 5,327,578 | 7/1994 | Breeden et al. | 455/434 |
| 5,369,683 | 11/1994 | Yabe et al. | 455/455 |
| 5,527,400 | 6/1996 | Yoshida | 455/434 |

FOREIGN PATENT DOCUMENTS

| | | |
|---|---|---|
| 59-28733 | 2/1987 | Japan . |
| 63-31232 | 2/1988 | Japan . |
| 4-239850 | 1/1991 | Japan . |

OTHER PUBLICATIONS

Copy of Office Action letter dated May 20, 1998 in JP Application No. 6–007616 and an English translation.
Japanese Office Action dated Jan. 29, 1998 with english translation.
Microsoft Press Computer Dictionary. 3rd Edition.
Merriam–Webster's Dictionary of Synonyms.
New Riverside University Dictionary.

*Primary Examiner*—David R. Hudspeth
*Assistant Examiner*—M. David Sofocleous
*Attorney, Agent, or Firm*—Morgan & Finnegan LLP

[57] ABSTRACT

A radio communicating apparatus for communicating via a radio signal comprises: a connecting unit to connect a terminal and a communication channel; and a controller for controlling the connecting unit so as to disconnect the communication channel when a control signal indicating that the communication is being executed is not received at a predetermined timing.

74 Claims, 6 Drawing Sheets

RADIO COMMUNICATING APPARATUS

This is a continuation of co-pending application Ser. No. 08/378,967, filed on Jan. 26, 1995.

BACKGROUND OF THE INVENTION

1. Field of the Invention

The invention relates to a radio communicating apparatus for performing a communication via a radio signal.

2. Related Background Art

A master telephone of a conventional cordless telephone changes from a speech communication state to an on-hook state in the case where the master telephone receives an on-hook signal from a slave telephone or cannot detect a carrier from the slave telephone.

However, when a power source of an apparatus which generates a radio wave of a speech communication channel used at present for a speech communication or the like is turned on during the speech communication, since the master telephone detects the carrier of the speech communication channel, when the reception of an off-hook signal from the slave telephone fails, the master telephone is not disconnected while capturing the line.

SUMMARY OF THE INVENTION

It is an object of the invention to make it possible to certainly detect that a communication terminal has finished a communication.

Another object of the invention is to prevent that a line is erroneously continuously held.

Still another object of the invention is to make it possible to properly restart a communication in the case where a state of a communication channel deteriorates after the start of the communication.

The above and other objects and features of the present invention will become apparent from the following detailed description and the appended claims with reference to the accompanying drawings.

DETAILED DESCRIPTION OF THE PREFERRED EMBODIMENTS

The first embodiment of the invention will now be described hereinbelow with reference to the drawings.

Figure 1:
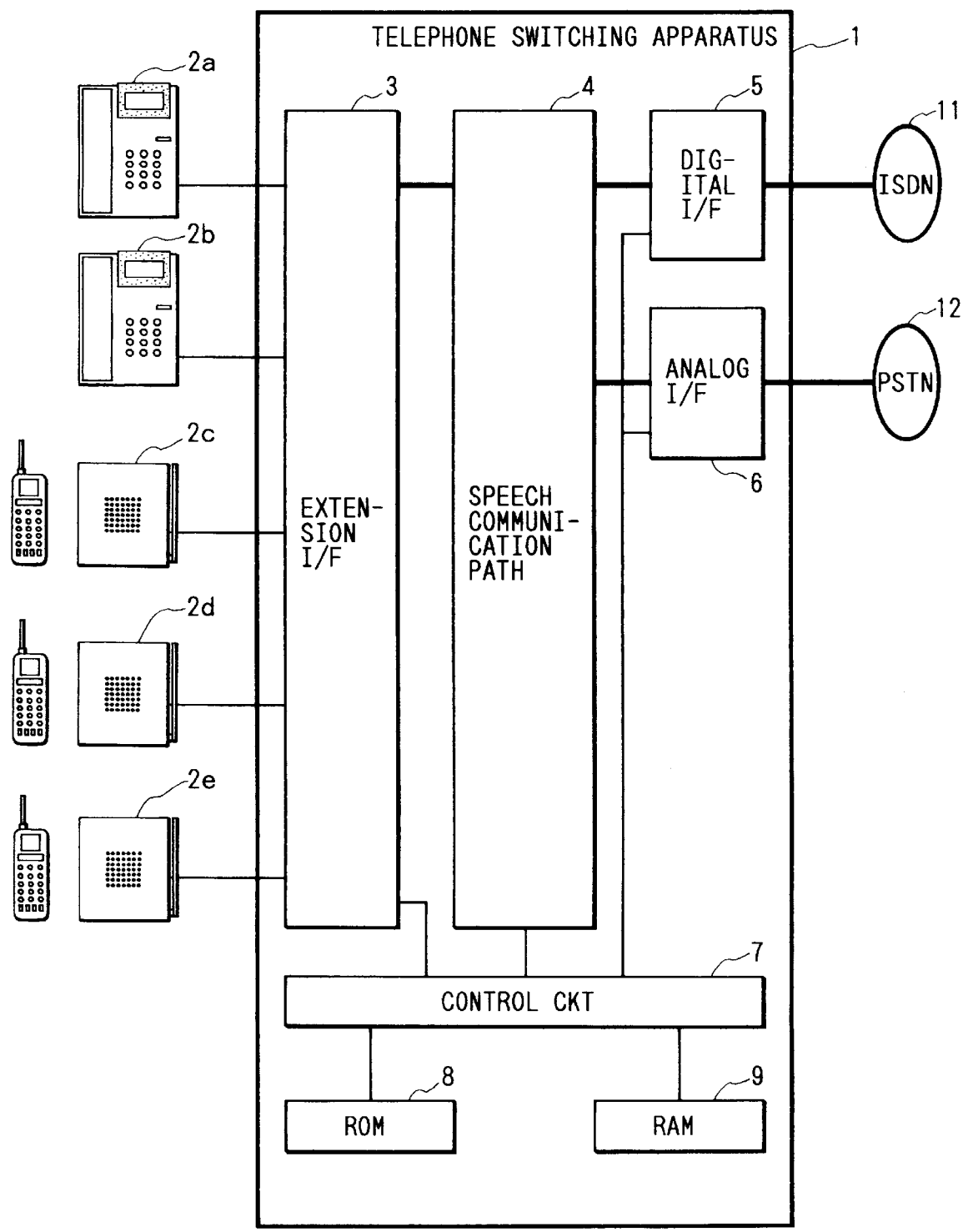
FIG. 1 is a block diagram showing a structure of a telephone switching apparatus.

FIG. 1 shows a block diagram of a telephone switching apparatus using the invention. In FIG. 1, a telephone switching apparatus 1 is connected to a digital communication network (ISDN) 11 and an analog communication network (PSTN) 12 through a digital interface 5 and an analog interface 6, respectively. The telephone switching apparatus 1 is also connected to extension exclusive-use telephones 2a and 2b and extension cordless telephones 2c, 2d, and 2e through an extension interface 3. Voice information from each of the above interfaces is switched in a speech communication path 4. A control circuit 7 controls each interface and the speech communication path. A program to execute the control by the control circuit 7 has been stored in an ROM 8. The writing and reading operations of data which is necessary for the control are executed to an RAM 9.

Figure 2:
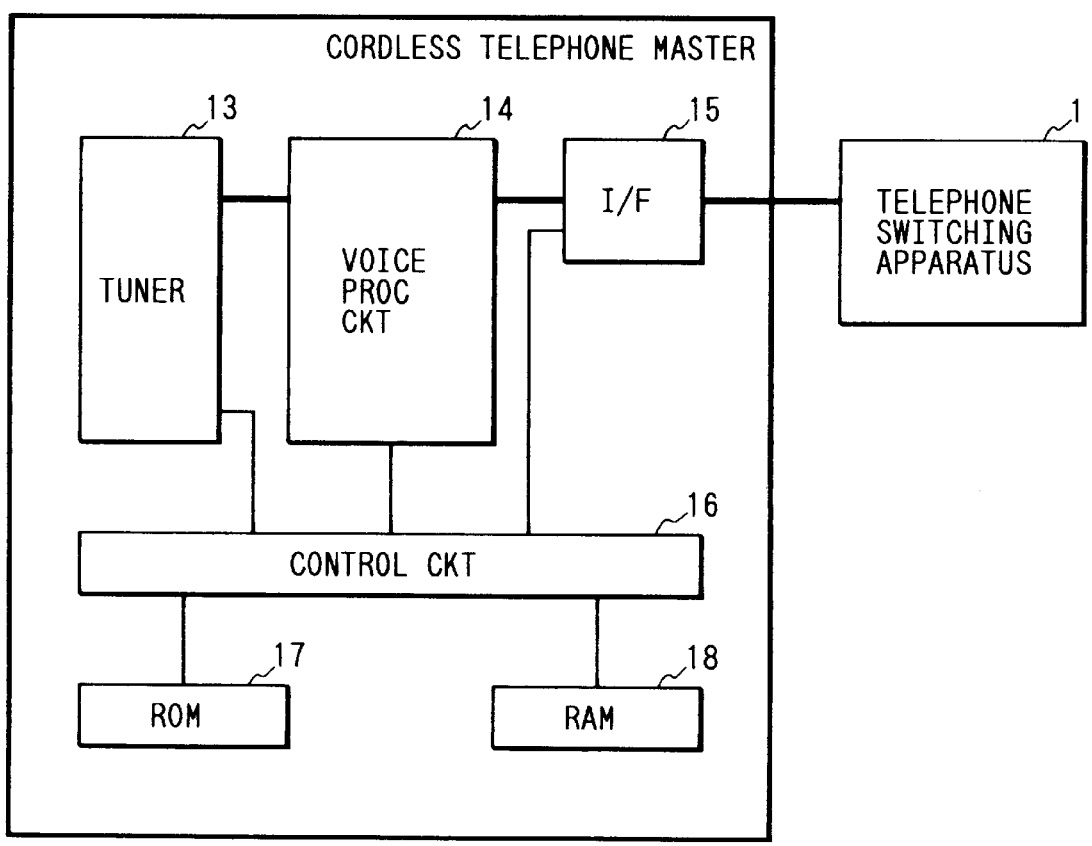
FIG. 2 is a block diagram of a cordless telephone master.

FIG. 2 shows a block diagram of a master telephone (also simply referred to as a master) of the cordless telephone. The cordless telephone master is connected to a line from the telephone switching apparatus 1 through an interface 15. The voice information is sent to a tuner 13 through a voice processing circuit 14. Control information is sent to a control circuit 16. A program to control the cordless telephone master has been stored in an ROM 17. The writing and reading operations of data which is necessary for control are executed to an RAM 18.

In the above construction, the cordless telephone executes a communication through a plurality of frequency divided communication channels.

Figure 3:
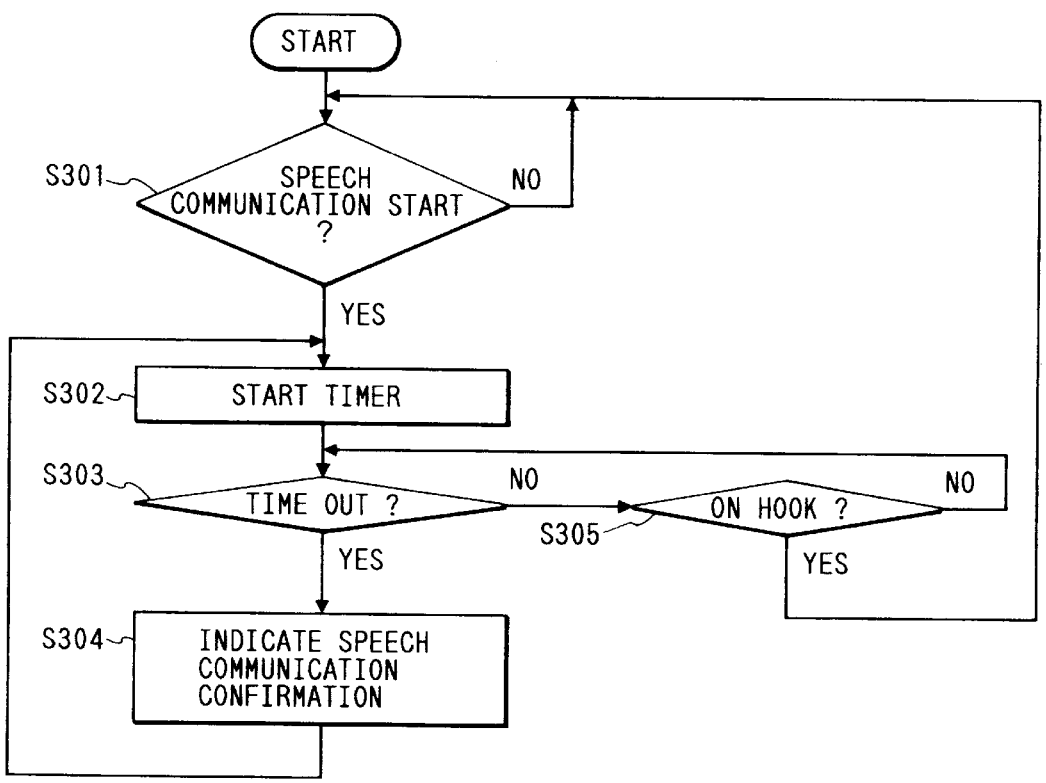
FIG. 3 is a flowchart showing the first control of a control circuit of the telephone switching apparatus embodying the invention.
Figure 4:
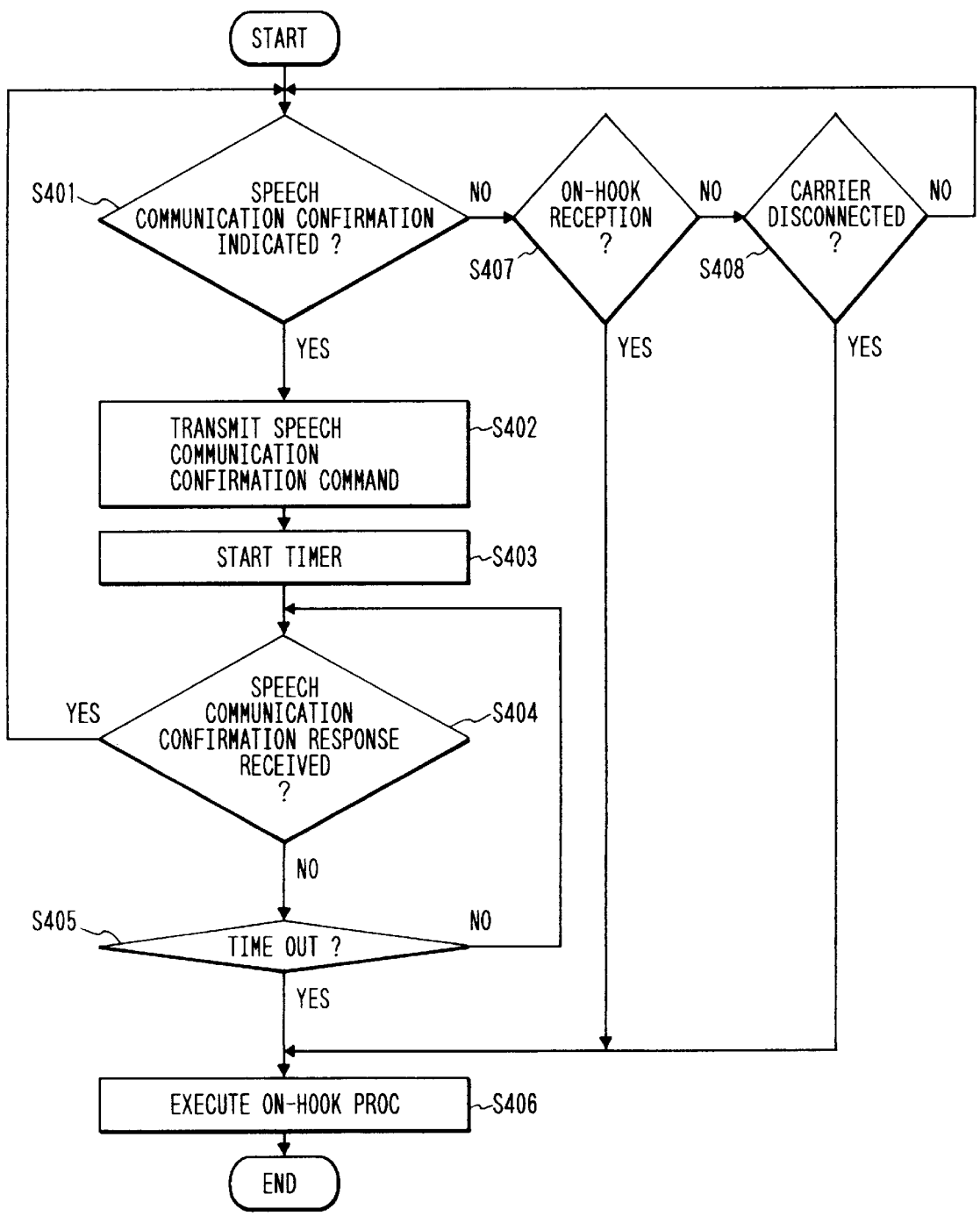
FIG. 4 is a flowchart showing the first control of a control circuit of a cordless telephone master embodying the invention.

FIG. 3 is a flowchart showing a control of the control circuit 7 of the telephone switching apparatus using the invention. FIG. 4 is a flowchart showing a control of the control circuit 16 of the master of the cordless telephone using of the invention. Those flowcharts are shown mainly with respect to the portions regarding the invention.

First, a method of setting a time interval to monitor a speech communication in the telephone switching apparatus will be described. The time interval for observation of a speech communication is set by numerical values of three digits which are inputted by depressing proper keys for a period of time between a set key and a set key in the extension exclusive-use telephone 2a. That is, in the extension exclusive-use telephone 2a, by depressing the keys such that (set)→(0)→(0)→(0)→(set), a mode such that the speech communication observation is not performed is set. By depressing the keys such that (set)→(0)→(3)→(0)→(set), a mode to execute the speech communication observation every 30 minutes is set. The time interval for the speech communication observation is stored into the RAM 9 of the telephone switching apparatus.

Subsequently, the controls in the control circuit 7 of the telephone switching apparatus and the control circuit 16 of the cordless telephone master will now be described with reference to FIGS. 3 and 4. When the cordless telephone enters a speech communication state (S301), the control circuit 7 of the telephone switching apparatus starts a timer to measure the time for speech communication observation (S302). The timer is provided on the RAM 9. When the timer times out (the time set to the time interval for the speech communication observation elapses) in step S303 before the cordless telephone enters the on-hook state in step S305, the control circuit 7 indicates the confirmation of the speech communication to the cordless telephone which is in the speech communication (S304). The timer is restarted.

When receiving an indication of the confirmation of the speech communication from the telephone switching apparatus in the speech communication state (S401), the control circuit 16 of the cordless telephone master transmits a speech communication confirmation command (state confirmation command) to a slave telephone (also simply referred to as a slave) (S402). The control circuit 16 starts a timer for waiting for a response to the speech communication confirmation command (S403) and waits for a response from the slave. The timer is provided on the RAM 18.

When receiving the speech communication confirmation command, the slave transmits a speech communication confirmation response when it is in the speech communication state.

When the response from the slave is received, this means that the speech communication is certainly being executed, so that the control circuit 16 of the master is returned to the ordinary speech communication state (S404). When the timer times out before the response from the slave is received (S405), the control circuit 16 judges that the slave is in the on-hook state, so that the control circuit 16 executes an on-hook process (disconnection of the radio line) and notifies the end of the speech communication state to the control circuit 7 of the telephone switching apparatus 1 (S406). In the speech communication state, in another case where the on-hook signal from the slave is received (S407) or where the carrier of the slave cannot be detected (S408), the control circuit 16 also executes the on-hook process and finishes the speech communication state.

When the end of the speech communication state is notified, the control circuit 7 recovers the line.

The second embodiment of the invention will now be described hereinbelow with reference to the drawings.

Figure 5:
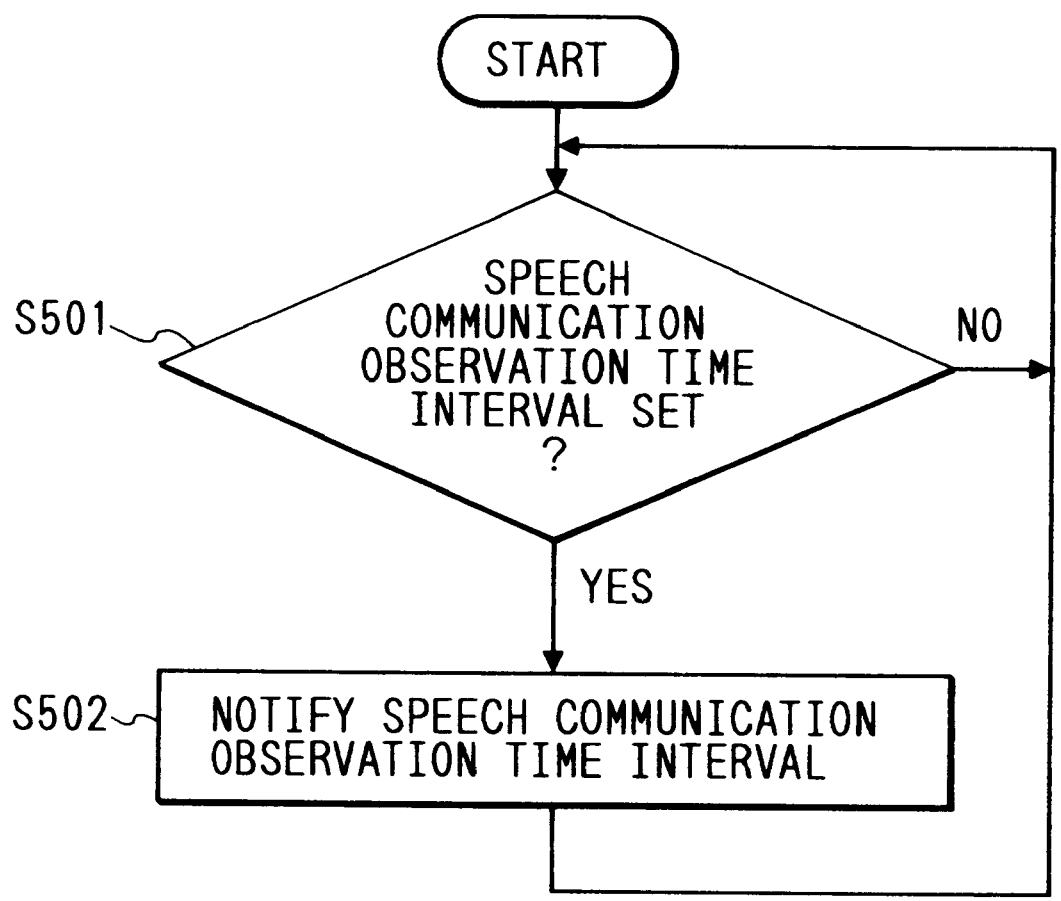
FIG. 5 is a flowchart showing the second control of the control circuit of the telephone switching apparatus embodying the invention.
Figure 6:
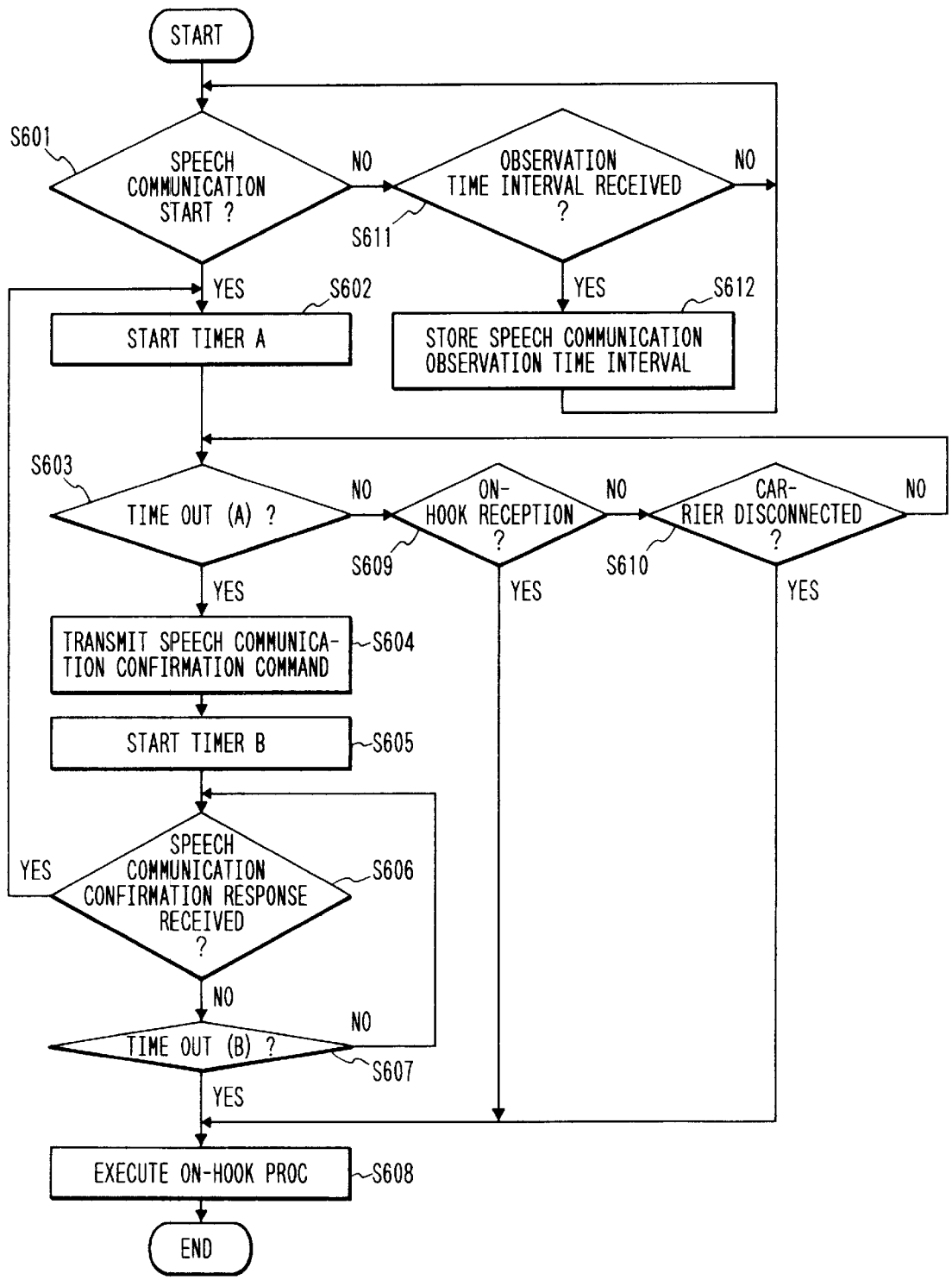
FIG. 6 is a flowchart showing the second control of the control circuit of the cordless telephone master embodying the invention.

FIG. 5 is a flowchart showing the control of the control circuit 7 of the telephone switching apparatus using the invention. FIG. 6 is a flowchart showing the control of the control circuit 16 of the master of the cordless telephone using the invention. Those flowcharts are shown mainly with respect to the invention.

The controls in the control circuit 7 of the telephone switching apparatus and the control circuit 16 of the cordless telephone master will now be described hereinbelow with reference to FIGS. 5 and 6. When the time interval for the speech communication observation is set (S501), the control circuit 7 of the telephone switching apparatus notifies the value of the set time interval to the cordless telephone master (S502).

When receiving the speech communication observation time interval from the telephone switching apparatus (S611), the control circuit 16 of the cordless telephone master stores the value of the time interval into the RAM 18 (S612). In the case where keys to register the speech communication observation time interval are provided for the master, the time interval is stored in accordance with an input of such keys. When the telephone enters the speech communication state (S601), the control circuit 16 starts a built-in timer (A) to measure the time interval of the speech communication observation (S602). When the timer (A) times out (S603), the control circuit 16 transmits a speech communication confirmation command (state confirmation command) to the slave (S604) and starts a timer (B) to wait for a response to the speech communication confirmation command (S605) and waits for a response from the slave.

When receiving the speech communication confirmation command, the slave transmits the speech communication confirmation response when it is in the speech communication state. When the response from the slave is received, this means that the speech communication is certainly being executed. Therefore, the control circuit 16 restarts the timer (A) (S602) and is returned to the ordinary speech communication state (S606).

When the timer (B) times out before the response from the slave is received (S607), the control circuit 16 executes the on-hook process (disconnection of the radio line) and notifies the end of the speech communication state to the control circuit 7 (S608). In the speech communication state, in another case where the on-hook signal from the slave is received (S609) or where the carrier of the slave cannot be detected (S610), the control circuit 16 also executes the on-hook process and finishes the speech communication state.

When the end of the speech communication state is notified, the control circuit 7 recovers the line.

In the first and second embodiments, when the speech communication confirmation command is not received at a predetermined interval during the speech communication of the slave, the on-hook process is also executed.

In the first and second embodiments, the speech communication confirmation command has been transmitted from the cordless telephone master to the slave. In the third embodiment, however, the speech communication confirmation command is transmitted from the slave to the master at a predetermined interval. When the speech communication confirmation command is not received within a specific time interval on the master side, the on-hook process is performed.

The invention is not limited to the cordless telephone connected to an extension of the telephone switching apparatus but can be also applied to a radio terminal connected directly to an external line.

Although the present invention has been described above with respect to the preferred embodiments, the invention is not limited to the foregoing embodiments but many modifications and variations are possible within the spirit and scope of the appended claims of the invention.

What is claimed is:

1. A communicating apparatus comprising:

connecting means for connecting a terminal and a communication line; and transmitting means for transmitting a communication end signal to the communication when a control signal to be transmitted by said terminal at a user specified time for indicating that a communication is being executed is not received.

2. An apparatus according to claim 1, wherein when said control signal indicating that the communication is being executed is not received at a predetermined timing, said transmitting means transmits the communication end signal.

3. An apparatus according to claim 1, wherein said connecting means connects the terminal via a radio communication channel.

4. An apparatus according to claim 1, wherein the control signal is received from said terminal which is performing speech communication.

5. A communication apparatus comprising:

connecting means for connecting a terminal and a communication line; and transmitting means for transmitting a communication end signal to the communication line when a carrier from the terminal is disconnected, wherein when a control signal to be transmitted by said terminal at a user specified time for indicating that a communication is being executed is not received, said transmitting means transmits the communication end signal to the communication line.

6. An apparatus according to claim 5, wherein said connecting means connects the terminal via a radio communication channel.

7. An apparatus according to claim 5, wherein the control signal is received from said terminal which is performing speech communication.

8. A communicating apparatus comprising:
communicating means for communicating with a partner; and
control means for controlling said communicating means so as to transmit a predetermined command at a user specified time during the communication,
wherein when a response to said predetermined command is not received, said control means controls said communicating means so as to finish the communication.

9. An apparatus according to claim 8, wherein said control means controls said communicating means so as to transmit said predetermined command at a timing indicated by a telephone switching apparatus.

10. An apparatus according to claim 8, wherein said control means controls said communicating means so as to transmit said command via a radio communication channel.

11. An apparatus according to claim 8, wherein said control means controls said communicating means so as to finish the communication when the response is not received via a radio communication channel.

12. An apparatus according to claim 8, wherein the response is received from the partner which is in speech communication.

13. A communicating apparatus comprising:
communicating means for communicating with a partner; and
control means for controlling said communicating means so as to transmit a control signal at a user specified time to confirm whether said partner is executing communication or not; and
judging means for judging whether a response to the control signal is received or not.

14. An apparatus according to claim 13, wherein said control means controls said communicating means so as to finish the communication in a case where responses to the control signals are not received.

15. An apparatus according to claim 14, wherein the responses are received from the partner which is in speech communication.

16. An apparatus according to claim 13, wherein said communicating means communicates with the partner via a radio communication line.

17. A communicating apparatus comprising:
first connecting means for connecting a terminal;
second connecting means for connecting a network; and
disconnecting means for disconnecting the connection with the network by said second connecting means when a control signal indicating that a communication is being executed is not received, wherein the control signal is transmitted from said terminal which started the communication through said network.

18. An apparatus according to claim 17, wherein said first connecting means connects said terminal via a radio communication channel.

19. An apparatus according to claim 17, wherein said disconnecting means disconnects the connection with said terminal by said first connection means and the connection with the network by said second connecting means when the control signal is not received at a user specified time from said terminal.

20. An apparatus according to claim 17, wherein the control signal is received from said terminal which is performing speech communication.

21. A communication apparatus comprising:
transmitting means for transmitting confirmation signals repeatedly;
receiving means for receiving control signals transmitted by a partner in response to the confirmation signals; and
judging means for judging that the partner who started a communication has finished the communication in a case where the control signals are not received.

22. An apparatus according to claim 21, wherein said receiving means receives the control signal via a radio communication channel.

23. An apparatus according to claim 21, wherein said judging means judges that the partner has finished the communication in a case where the control signal is not received at a user specified time.

24. An apparatus according to claim 21, wherein said judging means includes communicating means for communicating with the partner, and said communicating means finishes communicating in a case where said judging means judges that the partner has finished the communication.

25. An apparatus according to claim 21, wherein said judging means includes connecting means for connecting a network, and said connecting means disconnects the network in a case where said judging means judges that the partner has finished the communication.

26. An apparatus according to claim 21, wherein the partner performs speech communication.

27. A method for judging whether a partner has finished communication, comprising the steps of:
transmitting confirmation signals repeatedly;
receiving control signals transmitted by a partner in response to the confirmation signals; and
judging that the partner who started a communication has finished the communication in a case where the control signals are not received.

28. A method according to claim 27, wherein the control signals are received via a radio communication channel.

29. A method according to claim 27, wherein it is judged that the partner has finished the communication in a case where the control signals are not received repeatedly.

30. A method according to claim 27, wherein said judging step includes a step of communicating with the partner, and said communicating step finishes communicating in a case where said judging step judges that the partner has finished the communication.

31. A method according to claim 27, wherein said judging step includes a step of connecting a network, and said connecting step disconnects the network in a case where said judging step judges that the partner has finished the communication.

32. A method according to claim 27, wherein the partner performs speech communication.

33. A communication system comprising:
an extension interface for connecting a terminal;
connecting means for connecting an external line and the terminal via said extension interface; and
transmitting means for transmitting a communication end signal to the external line in a case where a control signal transmitted from the terminal which started a communication is not received by said extension interface.

34. A system according to claim 33, wherein said extension interface connects the terminal via a radio communication channel.

35. A system according to claim 34, wherein said extension interface disconnects the terminal in a case where the control signal is not received.

36. A system according to claim 34, wherein said connecting means disconnects the external line and the terminal in a case where the control signal is not received.

37. A system according to claim 35, wherein said transmitting means transmits the communication end signal in a case where the control signal is not received at a user specified time.

38. A system according to claim 33, wherein said extension interface transmits a command signal for confirming whether the terminal is executing the communication or not, and said transmitting means transmits the communication end signal in a case where the control signal is to be transmitted by the terminal in response to the command signal is not received.

39. A system according to claim 33, wherein the terminal performs speech communication.

40. A communication apparatus comprising:
 connecting means for connecting a terminal for performing speech communication;
 receiving means for receiving a control signal from a terminal which started the speech communication; and
 control means for controlling said connecting means so as to finish the speech communication in a case where the control signal is not received.

41. An apparatus according to claim 40, wherein said receiving means receives the control signal via a radio communication channel.

42. An apparatus according to claim 40, wherein said connecting means connects the terminal via a radio communication channel.

43. An apparatus according to claim 40, wherein said control means controls said connecting means so as to finish the speech communication in a case where the control signal which is transmitted by the terminal intermittently is not received.

44. A method for controlling a speech communication comprising the steps of:
 performing speech communication;
 periodically receiving a control signal from a terminal which started the speech communication; and
 controlling said communication step so as to finish the speech communication in a case where an expected control signal is not received.

45. A method according to claim 44, wherein the control signal is received via a radio communication channel.

46. A method according to claim 44, wherein said communicating step performs the speech communication via a radio communication channel.

47. A method according to claim 44, wherein the speech communication is finished in a case where the control signal which is transmitted by the terminal at a user specified time is not received.

48. A memory which stores therein a program for judging whether a partner has finished communication, the program comprising the steps of:
 transmitting confirmation signals repeatedly;
 periodically receiving a control signal transmitted by the partner in response to the confirmation signals; and
 judging that the partner who started the communication has finished the communication in a case where an expected control signal is not received.

49. A memory according to claim 48, wherein the control signal is not received via a radio communication channel.

50. A memory according to claim 48, wherein it is judged that the partner has finished the communication in the case where the control signal is not received repeatedly.

51. A memory according to claim 48, wherein the judging step includes a step of communicating with the partner, and the communicating step finishes communication in a case where the judging step judges that the partner has finished the communication.

52. A memory according to claim 48, wherein the judging step includes a step of connecting a network, and the connecting step disconnects the network in a case where the judging step judges that the partner has finished the communication.

53. A memory according to claim 48, wherein the partner performs speech communication.

54. A communication apparatus comprising:
 connecting means for connecting a terminal and a switching apparatus;
 informing means for informing the switching apparatus that the terminal has finished a communication in a case where a control signal to be transmitted from the terminal for indicating the communication is being executed is not received.

55. An apparatus according to claim 54, wherein said informing means comprises transmitting means for transmitting a confirmation signal, and informs the network that the terminal finishes the communication in a case where the control signal transmitted by the terminal in response to the confirmation signal is not received.

56. An apparatus according to claim 55, wherein said transmitting means transmits confirmation signals repeatedly, and said informing means informs the network that the terminal finishes the communication in a case where the control signal transmitted by the terminal in response to the confirmation signal is not received.

57. An apparatus according to claim 54, wherein said connecting means connects the terminal via a radio communication channel.

58. An apparatus according to claim 54, wherein said connecting means disconnects the terminal and the network in a case where a control signal transmitted from the terminal for indicating the communication is being executed is not received.

59. An apparatus according to claim 54, wherein said terminal performs speech communication.

60. An apparatus according to claim 54, wherein said informing means informs the network that the terminal finishes the communication when the control signal is not received and when a carrier from the terminal is disconnected.

61. A communication control method, comprising the steps of:
 connecting a terminal and a network; and
 informing the network that the terminal has finished a communication in a case where a control signal to be transmitted from the terminal for indicating the communication is being executed is not received.

62. A method according to claim 61, further comprising a step of transmitting a confirmation signal, and said informing step informs the network that the terminal finishes the communication in a case where the control signal transmitted by the terminal in response to the confirmation signal is not received.

63. A method according to claim 62, wherein confirmation signals are transmitted in said transmitting step repeatedly, and said informing step informs the network that the terminal finishes the communication in a case where control signals transmitted by the terminal in response to confirmation signals are not received.

64. A method according to claim 61, wherein the terminal is connected via a radio communication channel is said connecting step.

65. A method according to claim 61, wherein the terminal and the network is disconnected in a case where a control signal transmitted from the terminal for indication the communication is being executed is not received.

66. A method according to claim 61, wherein said terminal performs speech communication.

67. A method according to claim 61, wherein said informing step informs the network that the terminal finished the communication when the control signal is not received and when a carrier from the terminal is disconnected.

68. A memory which stores therein a program for controlling a communication, the program comprising the steps of:

connecting a terminal and a network; and informing the network that the terminal has finished a communication in a case where a control signal to be transmitted from the terminal for indicating that the communication is being executed is not received.

69. A memory according to claim 68, further comprising a step of transmitting a confirmation signal, and said informing step informs the network that the terminal finished the communication in a case where the control signal transmitted by the terminal in response to the confirmation signal is not received.

70. A memory according to claim 69, wherein confirmation signals are transmitted in said transmitting step repeatedly, and said informing step informs the network that the terminal finishes the communication in a case where control signals transmitted by the terminal in response to the confirmation signals.

71. A method according to claim 68, wherein the terminal is connected via a radio communication channel is said connecting step.

72. A memory according to claim 68, wherein the terminal and the network is disconnected in a case where a control signal transmitted from the terminal for indication the communication is being executed is not received.

73. A memory according to claim 68, wherein the terminal performs speech communication.

74. A memory according to claim 68, wherein said informing step informs the network that the terminal finishes the communication when the control signal is not received and when a carrier from the terminal is disconnected.

* * * * *

UNITED STATES PATENT AND TRADEMARK OFFICE
CERTIFICATE OF CORRECTION

PATENT NO. : 6,085,070
DATED : July 4, 2000
INVENTOR(S) : Mitsuhiro Watanabe

It is certified that error appears in the above-identified patent and that said Letters Patent is hereby corrected as shown below:

Title page,
Item [56], References Cited, U.S. PATENT DOCUMENTS, please insert the following:

| | | | |
|---|---|---|---|
| 4,468,539 | 8/28/84 | Schober | 379/61 |
| 4,991,198 | 2/5/91 | Tate et al. | 379/62 |
| 4,706,274 | 11/10/87 | Baker et al. | 379/61 |

FOREIGN PATENT DOCUMENTS,

| | | | |
|---|---|---|---|
| EP | 0310379 | Sept. 29, 1988 | European Patent Office |
| JP | 54075201 | June 15, 1979 | Japan |

Column 4, claim 1,
Line 39, "communication when" should read -- communication line when --.

Column 6, claim 35,
Line 65, "claim 34," should read -- claim 33, --.

Column 7, claim 36,
Line 1, "claim 34," should read -- claim 33, --.

UNITED STATES PATENT AND TRADEMARK OFFICE
CERTIFICATE OF CORRECTION

PATENT NO.      : 6,085,070
DATED           : July 4, 2000
INVENTOR(S)     : Mitsuhiro Watanabe It is certified that error appears in the above-identified patent and that said Letters Patent is hereby corrected as shown below:

Column 7, claim 37,
Line 4, "claim 35," should read -- claim 33, --.

Signed and Sealed this

Fifth Day of March, 2002

Attest:

JAMES E. ROGAN
*Attesting Officer*   *Director of the United States Patent and Trademark Office*